United States Patent
Takizawa (10) Patent No.: US 7,416,060 B2
(45) Date of Patent: Aug. 26, 2008

(54) BICYCLE DISC BRAKE ROTOR

(75) Inventor: Shinichi Takizawa, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/853,427

(22) Filed: Sep. 11, 2007

(65) Prior Publication Data

US 2008/0000729 A1    Jan. 3, 2008

Related U.S. Application Data

(62) Division of application No. 11/126,170, filed on May 11, 2005.

(30) Foreign Application Priority Data

Jul. 21, 2004    (JP) .............................. 2004-213148

(51) Int. Cl.
    *F16D 65/12* (2006.01)
(52) U.S. Cl. .................... 188/218 XL; 188/26
(58) Field of Classification Search ............. 188/17, 188/18 A, 26, 218 XL, 251 M
    See application file for complete search history.

(56) References Cited

U.S. PATENT DOCUMENTS

| | | | |
|---|---|---|---|
| 1,879,744 A | 9/1932 | Heiney | |
| 3,209,876 A | 10/1965 | Kraft | |
| 3,800,392 A | 4/1974 | Cook et al. | |
| 4,049,090 A * | 9/1977 | Buell | 188/251 M |
| 5,538,108 A | 7/1996 | Russo | |
| 5,612,110 A | 3/1997 | Watremez | |
| 5,878,843 A * | 3/1999 | Saum | 188/218 XL |
| 6,079,611 A | 6/2000 | Nakamura et al. | |
| 6,302,246 B1 * | 10/2001 | Naumann et al. | 188/218 XL |
| 6,349,800 B1 * | 2/2002 | Nakamura | 188/26 |
| 6,352,141 B1 * | 3/2002 | Wendt | 188/218 XL |
| 6,691,835 B1 | 2/2004 | Zavodony | |
| 6,913,124 B2 | 7/2005 | Tanaka et al. | |
| 6,935,470 B1 * | 8/2005 | Smith, Jr. | 188/218 XL |
| 7,066,556 B2 * | 6/2006 | Irie | 301/6.9 |
| 2001/0045332 A1 | 11/2001 | Takahashi et al. | |
| 2002/0153213 A1 * | 10/2002 | Gruber et al. | 188/218 XL |
| 2005/0145452 A1 | 7/2005 | Yamamoto | |
| 2005/0183909 A1 * | 8/2005 | Rau et al. | 188/218 XL |

FOREIGN PATENT DOCUMENTS

| | | |
|---|---|---|
| EP | 1016803 | 7/2000 |
| FR | 2717875 | 9/1995 |

(Continued)

*Primary Examiner*—Christopher P Schwartz
(74) *Attorney, Agent, or Firm*—Global IP Counselors, LLP (57) ABSTRACT

A composite material bicycle disc brake rotor is provided for a bicycle disc brake device and is designed to be mounted to a bicycle wheel hub directly or using a hub mounting member. The rotor basically includes a rotor member and a fastening member. The rotor member has a first ring-shaped member and a pair of second ring-shaped members disposed on opposite sides of the first member. The second members include a material with higher wear resistance than the first member. At least one fixing hole is formed through the first and second members and a depression is formed around the fixing hole on the surface of one of the second members. The fastening or tightening member is mounted through the fixing hole of the rotor member to fix the rotor member to another member.

20 Claims, 10 Drawing Sheets

FOREIGN PATENT DOCUMENTS

| | | | |
|---|---|---|---|
| JP | 54-101756 A | 8/1979 |
| JP | 62-77336 U | 5/1987 |
| JP | 02-113134 A | 4/1990 |
| JP | 2679162 B | 11/1997 |
| JP | 2687150 B | 12/1997 |
| JP | 2000-120732 A | 4/2000 |
| JP | 2001-311441 A | 11/2001 |
| JP | 2003-343619 A | 12/2003 |

* cited by examiner

BICYCLE DISC BRAKE ROTOR

CROSS-REFERENCE TO RELATED APPLICATIONS

This application is a divisional application of U.S. patent application Ser. No. 11/126,170 filed on Jul. 21, 2004. The entire disclosure of U.S. patent application Ser. No. 11/126,170 is hereby incorporated herein by reference.

This application claims priority to Japanese Patent Application No. 2004-213148. The entire disclosure of Japanese Patent Application No. 2004-213148 is hereby incorporated herein by reference.

BACKGROUND OF THE INVENTION

1. Field of the Invention

The present invention generally relates to a disc brake rotor, which selectively contacts the brake pads of a bicycle disc brake caliper. More specifically, the present invention relates to a composite material bicycle disc brake rotor designed to be mounted to a bicycle wheel hub without deformation of the rotor during attachment.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle brake device. In particular, in recent years, bicycles have been provided with disc braking devices in order to improve braking performance.

Bicycle disc brake devices are provided for controlling and stopping the relative rotation of the bicycle wheels. Each disc brake device typically includes a metal disc brake rotor that rotates in unison with one of the wheels, and disc brake calipers with brake pads that selectively contact the disc brake rotor and apply pressure thereto to apply a braking force. Typical disc brake devices can be fluid actuated (i.e. by fluid pressure) or cable (mechanically) actuated. In any case, the disc brake rotor includes a mounting member and a ring-shaped rotor member fixed to the mounting member. The mounting member is mountable to a hub of a bicycle wheel.

It is generally important to preserve the wear resistance of such disc brake devices to create more light-weight disc brake rotors with better heat dissipation. Particularly in the case of bicycles, which run on the use of human power, reducing the weight is one of the most important issues. A known example of a conventional disc brake rotor that is relatively light weight and has relatively good heat dissipation capability includes a rotor member that uses composite materials formed by laminating a stainless steel sheet to both sides of a core of aluminum or aluminum alloy. See, for example Japanese Patent 2679162.

Conventional rotor members involving the use of composite materials have a plurality of fixing holes. A flanged collar member involving the use of a zinc alloy material is mounted in the fixing holes.

In view of the above, it will be apparent to those skilled in the art from this disclosure that there exists a need for an improved bicycle disc brake rotor. This invention addresses this need in the art as well as other needs, which will become apparent to those skilled in the art from this disclosure.

SUMMARY OF THE INVENTION

One object of the present invention is to provide a bicycle disc brake rotor for a bicycle disc brake device that uses two members of different types of materials, which are tightened to a hub or a hub mounting member.

Another object of the present invention is to provide a bicycle disc brake rotor that uses two members of different types of materials tightened to a hub or a hub mounting member, which reduces and/or eliminates compression/deformation of the different materials.

Yet another object of the present invention is to provide a bicycle disc brake rotor that uses two members of different types of materials tightened to a hub or a hub mounting member, which facilitates effective tightening of the fasteners such as pins or bolts so that the disc brake rotor member is sufficiently attached to the hub or hub mounting member.

Yet another object of the present invention is to provide a bicycle disc brake rotor that uses two members of different types of materials, which is relatively strong yet relatively lightweight.

Yet still another object of the present invention is to provide a bicycle disc brake rotor that uses two members of different types of materials, which is relatively simple and inexpensive to manufacture and assemble.

In other words, the basic objective of the present invention is to prevent problems when bicycle disc brake rotor members involving the use of two members of different types of materials are tightened to a hub or mounting member.

Rotor members constructed of composite materials such as aluminum alloy flanked by hard stainless steel alloy can be tightened by means of tightening pins, such as rivets each having a head or heads and a shaft, to the hub or a mounting member. When such a rotor member is tightened with a tightening pin to the hub or mounting member in this manner, the relatively softer aluminum alloy component in the middle can become compressed by the head(s) of the tightening pins when the parts are tightened, resulting in dents on the surface. Such dents on the surface can make it more difficult for the tightening pin to work effectively, with the possibility of an insufficiently tightened rotor member.

The present invention seeks to prevent such problems when bicycle disc brake rotor members involving the use of two members of different types of materials are tightened to a hub or mounting member, such as is outlined in the objects of the present invention.

The foregoing objects can basically be attained by providing a bicycle disc brake rotor for a bicycle disc brake device. The bicycle disc brake rotor basically includes a rotor member, at least one fastening member and optionally a hub mounting member. The rotor member includes a first ring-shaped member and a pair of second ring-shaped members disposed on opposite sides of the first ring-shaped member. The second ring shaped members include a material with higher wear resistance than the first ring-shaped member. At least one fixing hole is formed through the first ring-shaped member and the second ring-shaped members with at least one depression formed in the surface of one of the second ring-shaped members around the fixing hole. The at least one fastening member is mounted through the fixing hole of the rotor member. The fastening member is configured and arranged to fixedly attach the rotor member to another member.

This disc brake rotor is designed to be directly fixedly attached to a bicycle wheel hub or a hub mounting member that can be removably and non-rotatably coupled to a bicycle wheel hub.

In this disc brake rotor, the rotor member is constructed of a first ring-shaped member, a second ring-shaped member disposed closely on both sides of the first member, a fixing hole, and a depression. A fixing hole is provided in the first and second members, and a depression is formed on the surface of one of the second members. Preferably, the head of a fixing means, such as a bolt or tightening pin (i.e. crimp pin or rivet), is disposed in the depression, and the fixing means passes through the fixing hole to fix the rotor member to the mounting member. The second member, which is disposed on both sides of the first member and comes into contact with the brake pad, is a material with greater wear resistance than the first member. Here, a depression is formed around the fixing hole, so that when the depression is formed, for example, by compressing the first readily deformable first member by means of a stepped pressing process while the second member is mounted on both sides of the first member, or a component serving as a preliminary depression of the first member is formed by being cut into a cylindrical shape through a machining process, for example, and one of the second members is aligned with it to form a concave shape by means of a pressing process or the like, the first member will be less likely to be further compressed, with less likelihood of becoming dented. The rotor member can thus be effectively tightened by the fixing means when fixed to the mounting member, without any tightening problems.

The foregoing objects can also basically be attained by providing a bicycle disc brake rotor for a bicycle disc brake device. The bicycle disc brake rotor basically includes a rotor member, at least one fastening member and optionally a hub mounting member. The rotor member includes a first ring-shaped member and a pair of second ring-shaped members disposed on opposite sides of the first ring-shaped member. The first ring-shaped member has at least one first fixing component extending radially inwardly from an inner peripheral surface thereof. Each of the second ring-shaped members has at least one second fixing component extending radially inwardly from an inner peripheral surface thereof aligned with the first fixing component. The second ring shaped members include a material with higher wear resistance than the first ring-shaped member. The at least one fastening member is configured and arranged to fixedly attach the first and second fixing components of the rotor member to another member.

In this disc brake rotor, the rotor member is constructed of a first ring-shaped member, a second ring-shaped member disposed closely on both sides of the first member, a fixing hole, and a depression. A fixing hole is preferably provided in the first and second members at the first and second fixing components, and a depression is preferably formed on the surface of one of the second members. The head of the fixing means, such as a bolt or tightening pin (i.e. crimp pin or rivet), is preferably disposed in the depression so that the fixing means passes through the fixing hole to fix the rotor member to the mounting member. The second member, which is disposed on both sides of the first member and comes into contact with the brake pad, is a material with greater wear resistance than the first member. Here, a depression is preferably formed around the fixing hole, so that when the depression is formed, for example, by compressing the first readily deformable first member by means of a stepped pressing process while the second member is mounted on both sides of the first member, or a component serving as a preliminary depression of the first member is formed by being cut into a cylindrical shape through a machining process, for example, and one of the second members is aligned with it to form a concave shape by means of a pressing process or the like, the first member will be less likely to be further compressed, with less likelihood of becoming dented. The rotor member can thus be effectively tightened by the fixing means when fixed to the hub, without any tightening problems.

A bicycle disc brake rotor in accordance with another aspect of the present invention includes a hub mounting member configured to be releasably attached to a bicycle hub to rotate therewith, and the fastening member fixedly attaches the rotor member to the hub mounting member.

In a bicycle disc brake rotor in accordance with another aspect of the present invention, the hub mounting member includes a hub attachment component that is configured to be releasably non-rotatably mounted to the bicycle hub and a rotor attachment component that is disposed on an outer periphery of the hub attachment component, the rotor member being fixedly attached to the rotor attachment component with the fastening member. In other words, the hub mounting member includes a hub attachment component that is disposed in the center and that is mounted on the hub; and a rotor attachment member that is disposed on the outer periphery to attach the rotor member. In this case, the mounting member is constructed of a hub attachment component and a rotor attachment component to make the mounting member more lightweight.

In a bicycle disc brake rotor in accordance with another aspect of the present invention has a hub mounting member that includes a material with greater thermal conductivity than the second members. In other words, the hub mounting member involves the use of a material with greater thermal conductivity than the second member. In this case, heat is more readily conducted from the second member to the mounting member, affording better heat dissipation.

In a bicycle disc brake rotor in accordance with another aspect of the present invention, the first ring-shaped member includes at least one first fixing component extending radially inwardly from an inner peripheral surface thereof, and each of the second ring-shaped members includes at least one second fixing component extending radially inwardly from an inner peripheral surface thereof that are aligned with first fixing component, the fixing hole extending through the first fastening component and the second fastening components aligned with the first fastening component.

In a bicycle disc brake rotor in accordance with another aspect of the present invention, the depression is formed utilizing a stepped pressing process that presses the surface of one of the second members using a mold. In other words, the depression is formed by a stepped pressing process for pressing the surface of one of the second members using a mold. In this case, it is easier to form a depression in which the relatively soft first member is compressed by stepped pressing to become thinner than the other components.

In a bicycle disc brake rotor in accordance with another aspect of the present invention, a plurality of the fixing holes are disposed at spaced intervals in a circumferential direction about the rotor member. In other words, a plurality of fixing holes are disposed at intervals in the rotating direction. In this case, the plurality of fixing hole ensures that the rotor member is prevented from rotating and is fixed to the hub or mounting member.

In a bicycle disc brake rotor in accordance with another aspect of the present invention, the first member includes a material with greater thermal conductivity than the second members. In other words, the first member involves the use of a material with greater thermal conductivity than the second member. In this case, the heat produced by the friction between the second member and the brake pad is more readily conducted through the first member to the mounting member or hub, affording better heat dissipation. Moreover, the formation of the depression increases the area in contact between the first member and one of the second members, thereby affording even better heat dissipation.

In a bicycle disc brake rotor in accordance with another aspect of the present invention, the first member is constructed of an aluminum alloy, and the second member is constructed of stainless steel alloy. In this case, the wear resistance is preserved by the second member constructed of stainless steel alloy, and the first member constructed of aluminum alloy results in lighter weight and better heat dissipation.

In a bicycle disc brake rotor in accordance with another aspect of the present invention, the second member has undergone a hardening process. In this case, the hardening improves the hardness of the surface of the second member that is in contact with the brake pad, resulting in even better wear resistance.

In a bicycle disc brake rotor in accordance with another aspect of the present invention, the rotor member is formed by pressing clad materials comprising sheets of the hardened stainless steel which will become the second members pressure welded by means of hot rolling or forge welding to both sides of the aluminum sheet that is to become the first member. In this case, the first and second members are pre-pressure welded, making it even more difficult for them to become separated. Also, there is no need for them to be fixed individually when fixed to the mounting member or hub, thus simplifying the fixing process.

In a bicycle disc brake rotor in accordance with another aspect of the present invention, the first member is between 0.5 mm and 1.5 mm thick, and the second member is between 0.2 mm and 0.8 mm thick. In this case, the first member with lower wear resistance located in the middle is relatively thick, at between 0.5 and 1.5 mm, allowing the overall thinness to be preserved while preserving strength. The second member with higher wear resistance located on both sides is relatively thin, at between 0.2 and 0.8 mm, allowing the overall thinness to be preserved while staying more lightweight.

In a bicycle disc brake rotor in accordance with another aspect of the present invention, the first ring-shaped member includes a plurality of first fixing components extending radially inwardly therefrom in a circumferentially spaced arrangement and each of the second ring-shaped members includes a plurality of second fixing components extending radially inwardly therefrom in a circumferentially spaced arrangement to be aligned with the first fixing components, and the fixing holes are formed in the first and second fixing components. In other words, the first and second members separately comprise first and second ring components; first protrusions, in which the aforementioned fixing hole is formed, that protrude radially on the inner periphery of the first and second ring components and that are formed at intervals in the peripheral direction; and second protrusions, wherein the aforementioned fixing hole and depression are formed in one, and the fixing hole is formed in the other. In this case, fixing holes are provided in the inwardly extending protruding protrusions, making it easier to fix the first and second members to the mounting member or hub.

In a bicycle disc brake rotor in accordance with another aspect of the present invention, the fastening member includes a head that is received in the depression and a shaft of smaller diameter than the head. In other words, the fixing means comprises a head that is housed in the depression and a shaft of smaller diameter than the head. In this case, the head is housed in the depression so that the depression is less likely to become deformed when pressed.

In a bicycle disc brake rotor in accordance with another aspect of the present invention, the head is received in the depression so as not to protrude from the depression. In other words, the head is housed in the depression so as not to protrude from the depression. In this case, the head of the fixing means does not protrude from the depression, thereby preventing it from coming into contact with the other parts such as the caliper when the disc brake rotor is rotated, while also making the brake device more compact as a whole.

In a bicycle disc brake rotor in accordance with another aspect of the present invention, the fastening member is a tightening pin for tightening the first and second members together to another member. In other words, the fixing means comprises a tightening pin for tightening the first and second members en masse to the mounting member or hub. In this case, the tightening pin allows both members to be firmly fixed to the mounting member or hub with a simple structure.

In a bicycle disc brake rotor in accordance with another aspect of the present invention, the tightening pin is constructed of stainless steel alloy. In this case, the use of stainless steel alloy affords better strength and corrosion resistance.

In a bicycle disc brake rotor in accordance with another aspect of the present invention, the second ring-shaped members are constructed as separate members from each other.

In a bicycle disc brake rotor in accordance with another aspect of the present invention, the first ring-shaped member includes a plurality of the first fixing components extending radially inwardly therefrom in a circumferentially spaced arrangement and each of the second members includes a plurality of the second fixing components extending radially inwardly therefrom in a circumferentially spaced arrangement to be aligned with the first fixing components.

A depression is formed around the fixing hole in the present invention, so that when the depression is formed, for example, by compressing the first readily deformable first member by means of a stepped pressing process while the second member is mounted on both sides of the first member, or a component serving as a preliminary depression of the first member is formed by being cut into a cylindrical shape through a machining process, for example, and one of the second members is aligned with it to form a concave shape by means of a pressing process or the like, the first member will be less likely to be further compressed, with less likelihood of becoming dented. The rotor member can thus be effectively tightened by the fixing means when fixed to the hub or mounting member, without any tightening problems.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
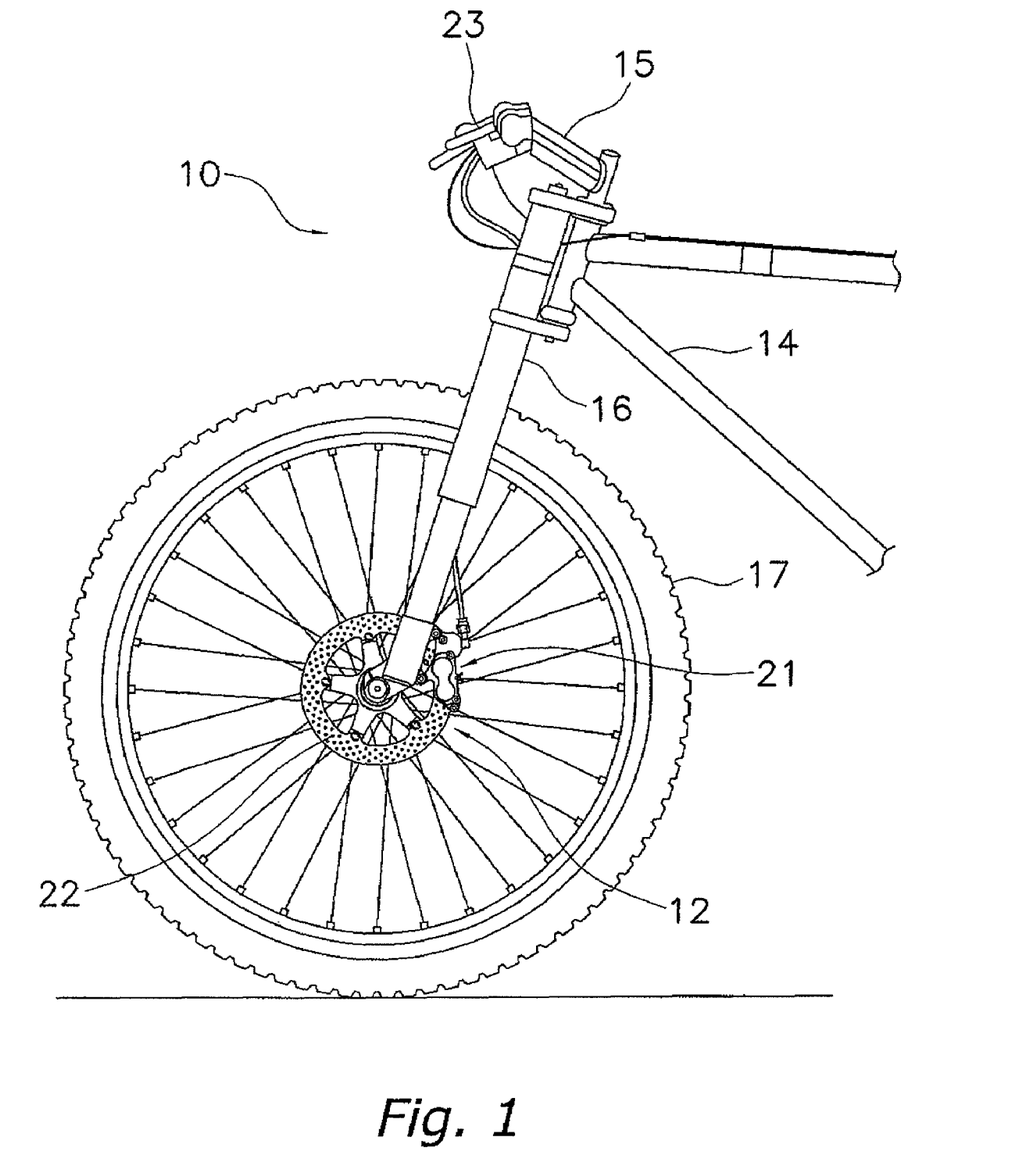
FIG. 1 is a side elevational view of the front portion of a bicycle with a disc brake rotor for a bicycle disc brake device coupled thereto in accordance with a preferred embodiment of the present invention.

Referring initially to FIG. 1, a bicycle 10 is illustrated with a bicycle disc brake device 12 mounted thereon in accordance with a preferred embodiment of the present invention. The various parts and/or components (technology) of bicycles such as the bicycle 10 are generally well known in the bicycle art. Accordingly, the bicycle 10 and the various structural and operating components of the bicycle 10 will not be described and/or illustrated in detail herein, except as related to the bicycle disc brake device 12 of the present invention.

The bicycle 10 is conventionally known, except for certain parts of the disc brake device 12, as explained below. Accordingly, the bicycle 10 includes a bicycle frame 14 with a handlebar 15, front and rear forks 16 (only front fork shown), front and rear wheels 17 (only front wheel shown), and a conventional drive train (not shown). The drive train (not shown) basically includes front and rear sprockets, a chain, front and rear derailleurs, etc. or the like. The front fork 16 illustrated herein has a double crown suspension, Of course, it will be apparent to those skilled in the art from this disclosure that the bicycle 10 may also include various conventional parts or components as needed and/or desired without departing from the present invention.

The bicycle disc brake device 12 basically includes a bicycle disc brake caliper 21 mounted on the front fork 16, a bicycle disc brake rotor 22 and a brake operating mechanism 23.

Figure 2:
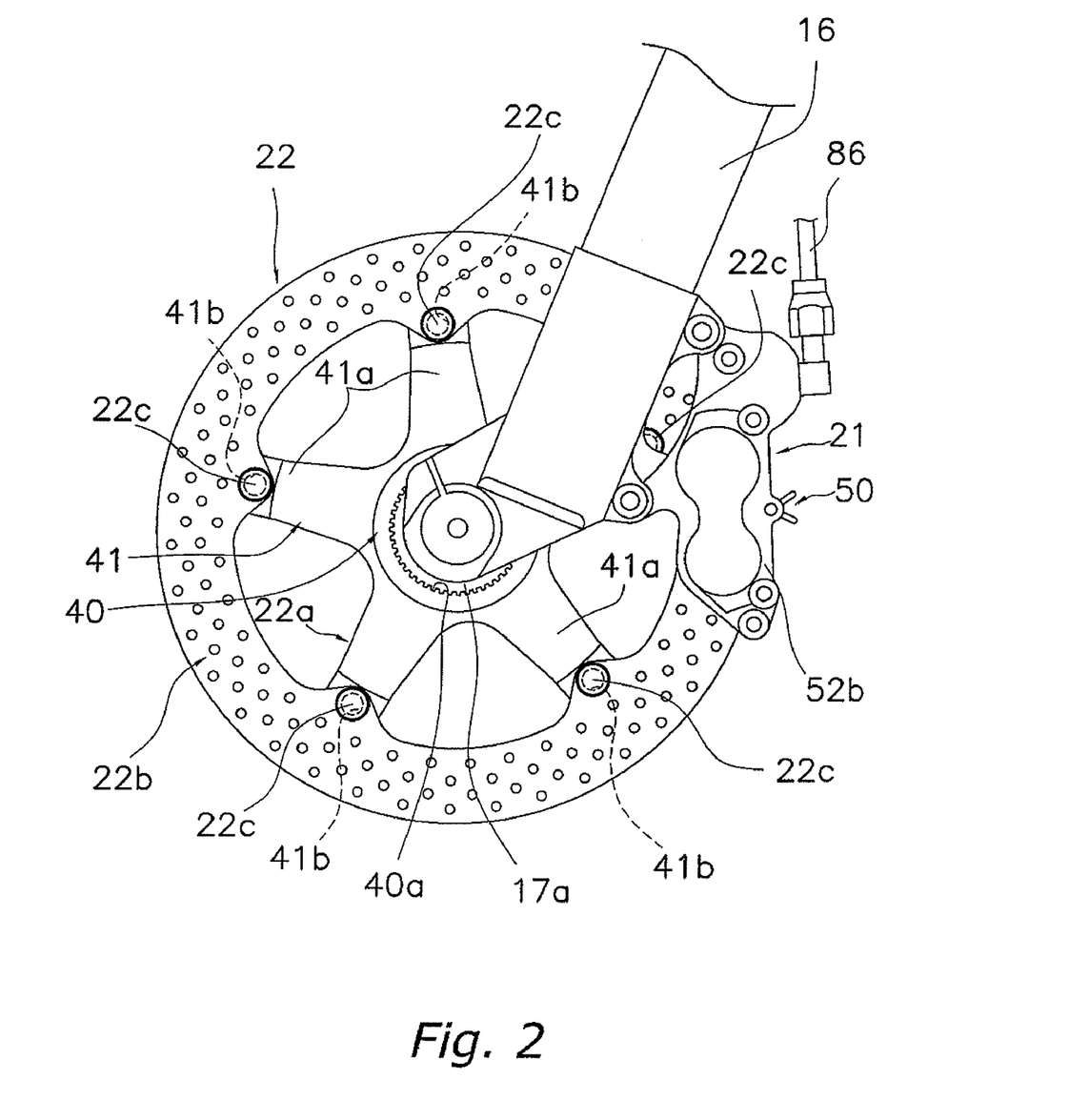
FIG. 2 is an enlarged, partial side elevational view of the portion of the bicycle illustrated in FIG. 1, with the disc brake rotor for a disc brake device coupled thereto.
Figure 3:
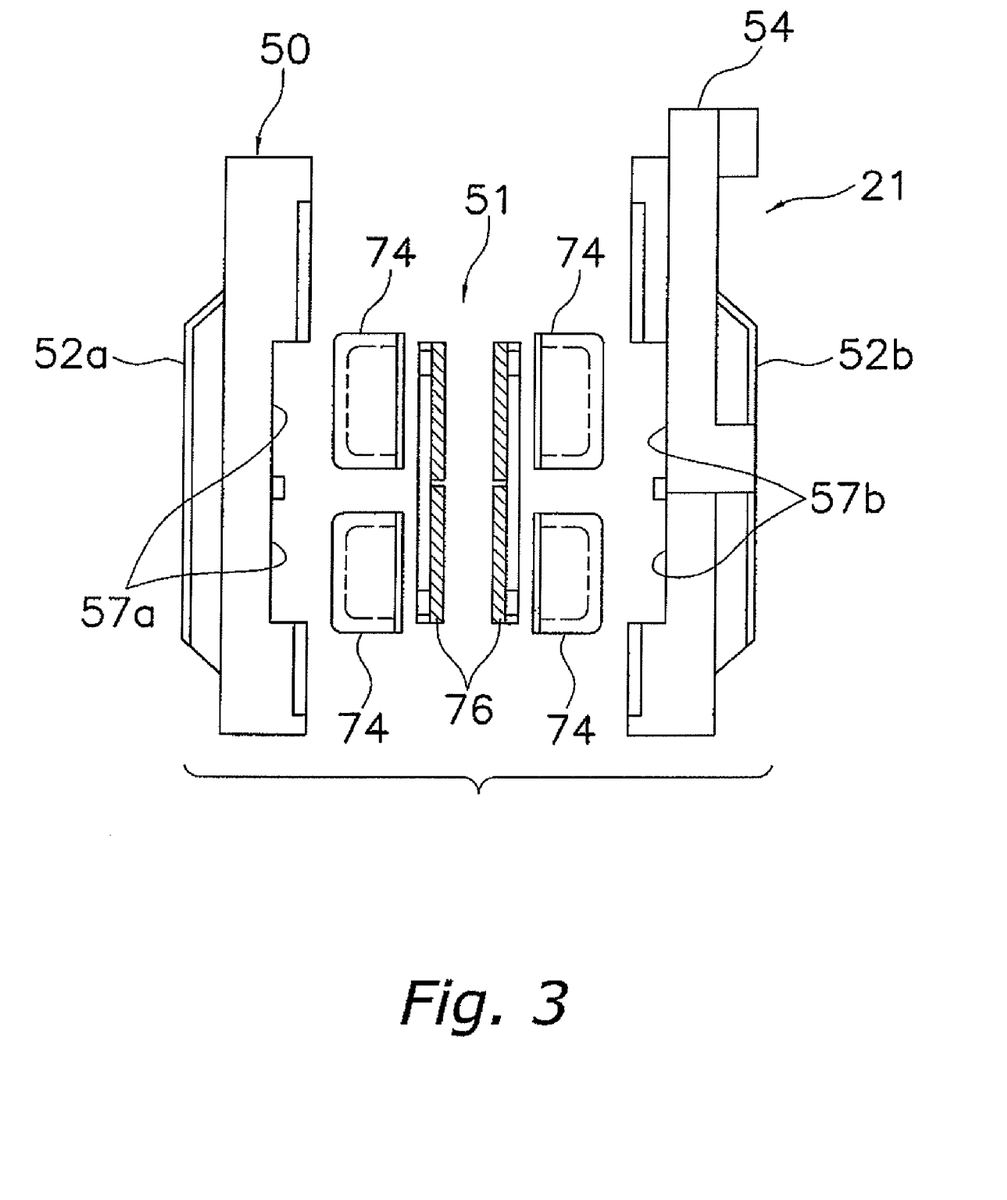
FIG. 3 is an exploded schematic (diagrammatic) view of the disc brake caliper of the disc brake device illustrated in FIGS. 1 and 2.

The disc brake caliper 21 is attached to the front fork 16 of the bicycle 10 at a location near the disc brake rotor 22, and applies tightening force to the disc brake rotor 22 to stop it from rotating. As illustrated in FIGS. 2 and 3, the brake caliper 21 basically includes a housing 50 and piston unit 51. The housing 50 is constructed of a thermally conducting material such as an aluminum alloy. The housing 50 includes a first housing member 52a and second housing member 52b fixedly attached (e.g. bolt-joined) to the first housing member 52a. The two housing members 52a and 52b have substantially the same shape, but are substantially mirror images of each other. Hydraulic tubing 86 is connected between the second housing member 52b and the brake operating mechanism 23 to supply hydraulic brake fluid (e.g. mineral oil) to both housing members 52a and 52b.

Figure 5:
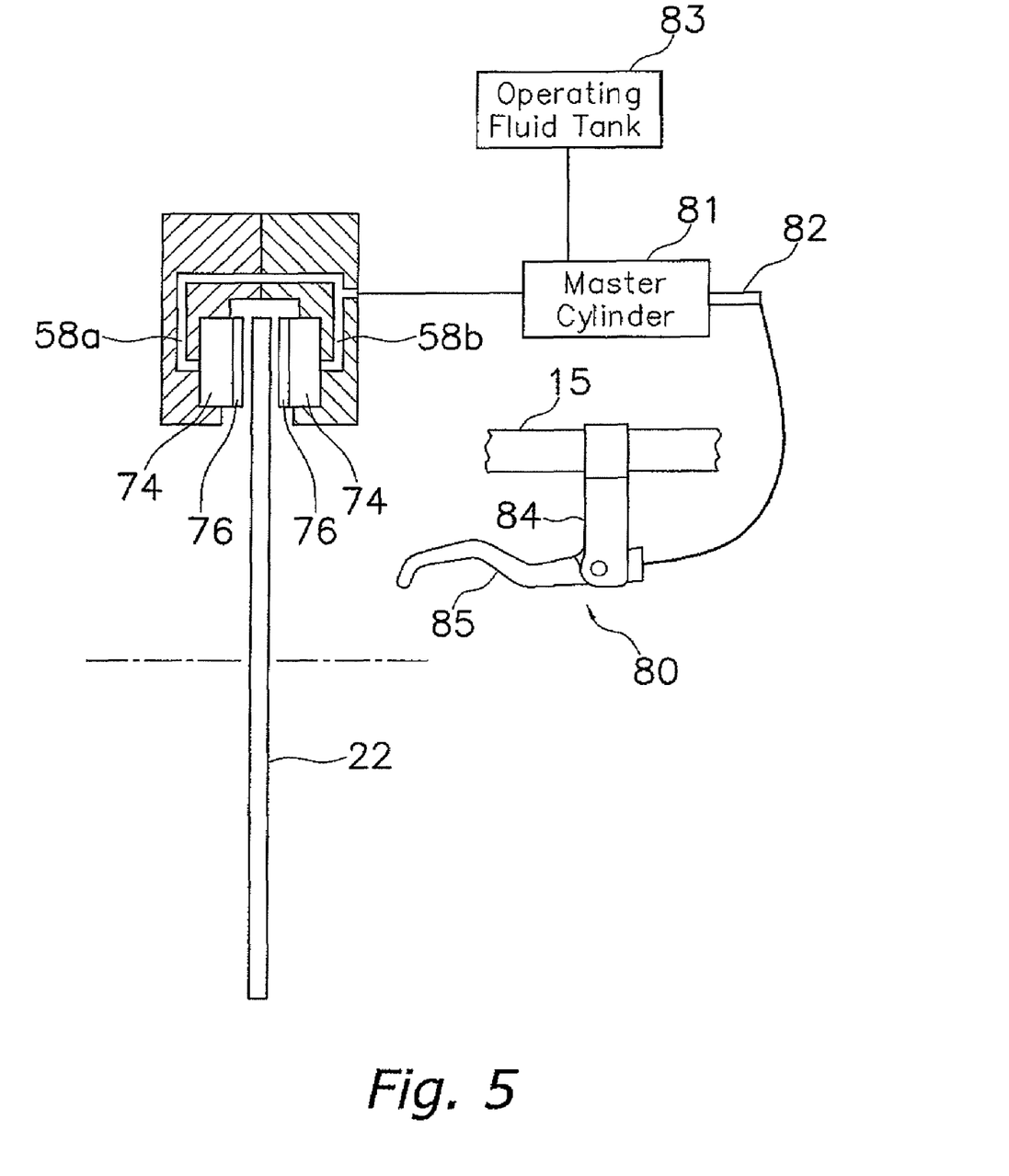
FIG. 5 is a schematic (diagrammatic) structural diagram of the disc brake operating mechanism illustrated in FIG. 4.

The second housing member 52b has an outwardly extending flange forming an attachment member 54 for fixedly attaching (bolting) the brake caliper 21 to the front fork 16. When both housing members 52a and 52b are bolted tightly together (i.e. assembled), a brake slot is formed between them to allow the disc brake rotor 22 to be partially received therein to rotate through the slot. As illustrated in FIGS. 3 and 5, two round cylindrical recesses 57a are formed in the first housing member 52a with two pistons 74 received therein, while two round cylindrical recesses 57b are formed in the second housing member 52b with two pistons 74 received therein. In other words, the recesses 57a and 57b movably support (house) the pistons 74 within the disc brake caliper 21. Additionally, fluid conduits (oil lines) 58a and 58b are formed in the first and second housing members 52a and 52b, respectively, in order to supply hydraulic brake fluid (oil) to the cylindrical recesses 57a and 57b, respectively. The hydraulic brake fluid (oil) supplied from the brake operating mechanism 23 via the tubing 86 flows into the second housing member 52b and through the oil lines 58a and 58b into the recesses 57a and 57b, allowing the piston unit 51 to be operated.

As illustrated in FIG. 3, the piston unit 51 basically includes the four pistons 74 and a pair of brake pads 76. The pistons 74 slidably fit into the pairs of cylindrical recesses 57a and 57b to move between release positions and braking positions (not shown). The brake pads 76 are disposed at the free ends (tips) of the pistons 74 (i.e. outside of the recesses 57a and 57b) and move in unison. Thus, when the pistons 74 are moved from the release positions to the braking positions, the brake pads 76 also move from the release positions to the braking positions. When in the braking position, the brake pads 76 squeeze (pinch) the disc brake rotor 22 and to apply a friction force in order to apply a slowing/stopping force (brake force) to the front wheel 17 by means of the disc brake rotor 22. When in the release position, the brake pads 76 move away from (withdraw) the disc brake rotor 22, allowing the disc brake rotor 22 to freely rotate. The piston unit 51 basically moves relative to the housing 50 in a conventional manner. In other words, the disc brake caliper 21 is basically conventional, except as discussed and/or illustrated herein.

The disc brake rotor 22 is fixedly attached to the hub 17a of the front wheel 17 to rotate together with (in conjunction with) the front wheel 17. As illustrated in FIG. 2, the disc brake rotor 22 basically includes a hub mounting member 22a, a ring-shaped rotor member 22b and a plurality of fastening or tightening members (pins) 22c such as crimp pins, rivets or bolts. The hub mounting member 22a is located in the center with the ring-shaped rotor member 22b serving as the outer peripheral frictional or engagement surface of the disc brake rotor 22. The tightening pins 22c are used to fixedly attach (serve as the fixing means for fixing) the rotor member 22b to the hub mounting member 22a.

The hub mounting member 22a is preferably constructed of a lightweight, rigid material such as a metallic material (e.g. an aluminum alloy). The hub mounting member 22a includes a hub attachment component 40 and a rotor attachment component 41. The hub attachment component 40 is disposed in the center or central area of the hub mounting member 22a and mounted on the hub 17a. The rotor attachment component 41 is disposed on the outer periphery of the hub mounting member 22a for attaching the rotor member 22b thereto. The hub attachment component 40 is a cylindrical member. A serrated element 40*a* is non-rotatably mounted on the hub 17*a*. The serrated element 40*a* is preferably integrally formed on the inner periphery of the hub attachment component 40 to non-rotatably mate with a similar element of the hub 17*a* to rotate with the front wheel 17. The rotor attachment component 41 has a plurality of (i.e. five) arm portions 41*a* that extend radially outwardly from the hub attachment component 40. A fixing hole 41*b* is formed in the tip of each of the arm portions 41*a* for fixing the rotor member 22*b* to the hub attachment component. Additionally, as seen in FIGS. 6 and 8, each arm portion 41*a* includes a recessed area formed in one side at the tip portion with the respective fixing hole 41*b* disposed at the recessed area.

Figure 6:
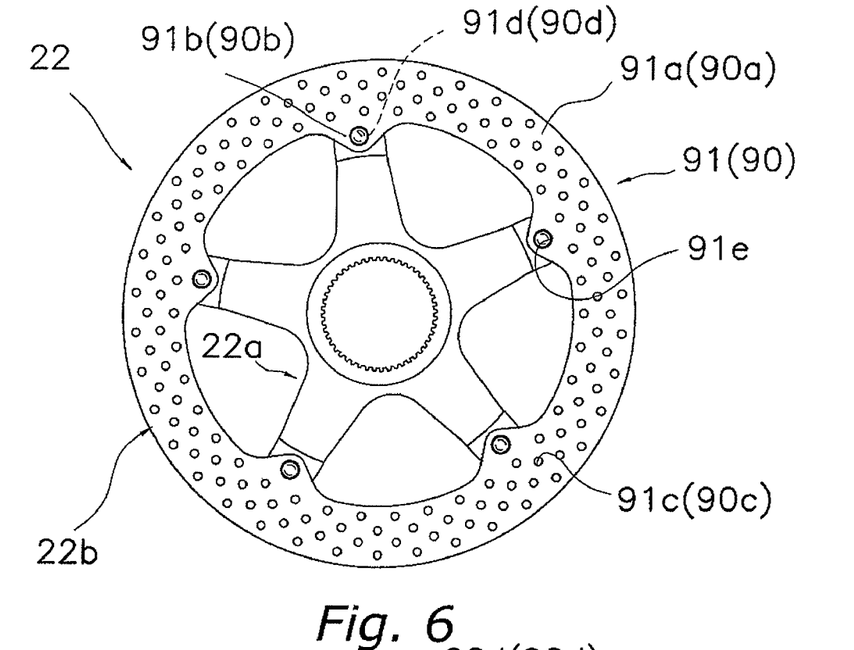
FIG. 6 is a first (outside) elevational view of the disc brake rotor for a disc brake device illustrated in FIGS. 1 and 2.
Figure 7:
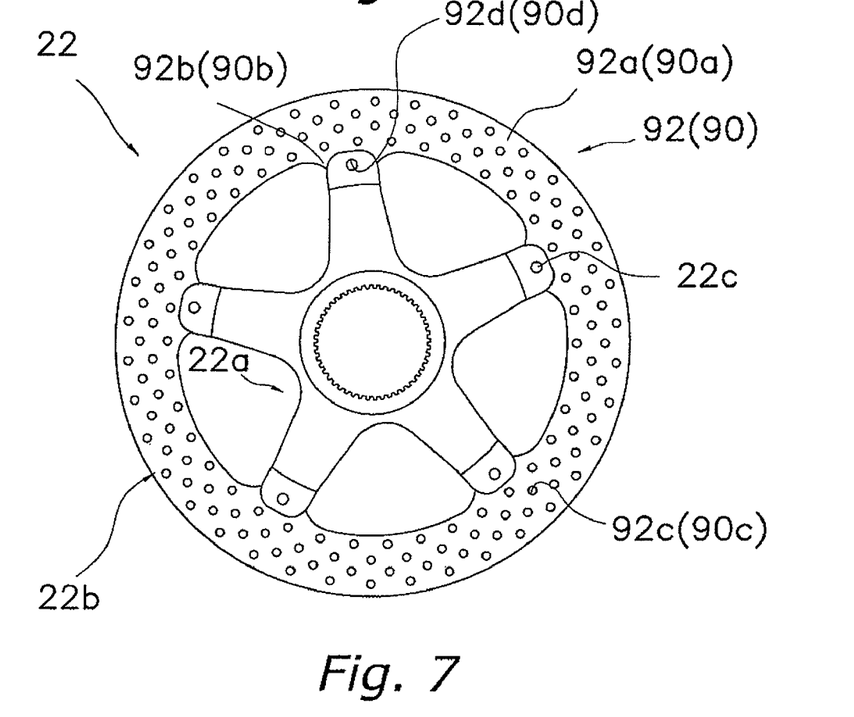
FIG. 7 is a second opposite (inside) elevational view of the disc brake rotor illustrated in FIG. 6.
Figure 8:
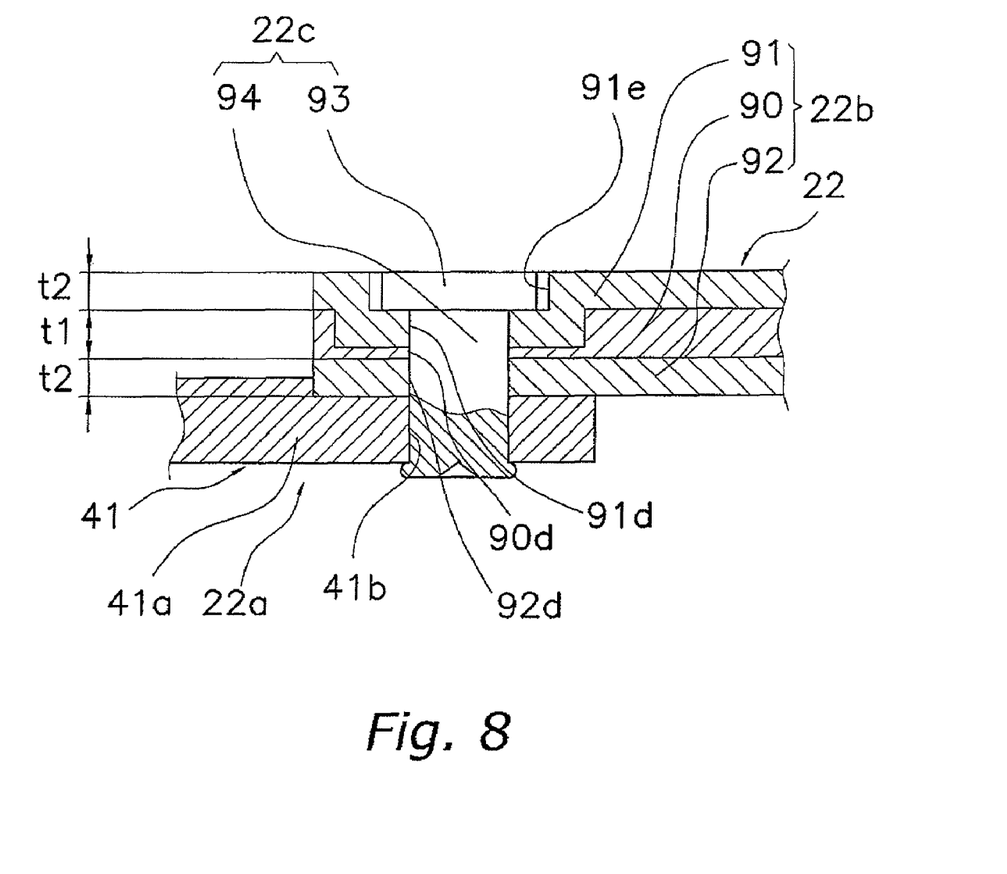
FIG. 8 is an enlarged, partial schematic cross sectional view of the disc brake rotor illustrated in FIGS. 6-7, as seen along a radially extending section line passing through one of the fastening members.

As illustrated in FIGS. 6 through 8, the rotor member 22*b* is formed of a composite material. In particular, the rotor member includes a pair of outer (second) members 91 and 92, each preferably constructed of stainless steel alloy. In any case, pair of outer (second) members 91 and 92 are preferably constructed of the same material, the material having greater friction resistance (higher coefficient of friction) than aluminum. The pair of outer (second) members 91 and 92 are pressure bonded to opposite axial sides (i.e. both sides) of an inner (first) member 90, which is preferably constructed of aluminum alloy. In any case, the inner (first) member is preferably constructed of a material with greater thermal conductivity than the stainless steel alloy (i.e. the material of the second members 91 and 92). Moreover, the hub mounting member 22*a* (preferably constructed of aluminum alloy) is preferably constructed of a material with greater thermal conductivity than the second members 91 and 92. The first member 90 and second members 91 and 92 of the rotor member 22*b* have substantially the same shapes. The first member 90 includes a first ring component 90*a*, a plurality of (five) first fixing components 90*b* protruding radially inwardly and formed at equally spaced intervals in the peripheral direction along the inner periphery of the first ring component 90*a*, and a plurality of weight reduction (lightening) holes 90*c* formed in the first ring component 90*a* to reduce the weight. Similarly, the second member 91 includes a second ring component 91*a*, a plurality of (five) second fixing components 91*b* protruding radially inwardly and formed at equally spaced intervals in the peripheral direction along the inner periphery of the second ring component 91*a*, and a plurality of weight reduction (lightening) holes 91*c* formed in the second ring component 91*a* to reduce the weight. The second member 92 is very similar to the second member 91. Thus, the second member 92 includes a second ring component 92*a*, a plurality of (five) second fixing components 92*b* protruding radially inwardly and formed at equally spaced intervals in the peripheral direction along the inner periphery of the second ring component 92*a*, and a plurality of weight reduction (lightening) holes 92*c* formed in the second ring component 92*a* to reduce the weight. The radial width of the first and second ring components 90*a*, 91*a*, and 92*a* are larger than corresponding dimension of the brake pads 76 in contact with the second ring components 91*a* and 92*a*. This arrangement is provided so the entire (radial) width of the second ring components 91*a* and 92*a* will not be subject to wear, and so that any such wear will not result in differences (reduction) in the levels (thickness) between the second fixing components 91*b* and 92*b*. As a result, there will be less stress concentrated in such areas with differences in levels, and thus, a substantial increase in braking strength can be achieved. In other words, the brake pads 76 and the first and second ring components 90*a*, 91*a*, and 92*a* are configured and arranged such that wear is minimized or eliminated at the second fixing components 91*b* and 92*b*, and thus, fastening strength can be maintained and increased stress at the second fixing components 91*b* and 92*b* due to wear can be minimized.

Each of the first fixing components 90*b* includes a fixing hole 90*d* formed therein, each of the second fixing components 91*b* includes a fixing hole 91*d* formed therein, and each of the second fixing components 92*b* includes a fixing hole 92*d* formed therein. The fixing holes 90*d*, 91*d*, and 92*d* are formed at the same radial positions as the fixing holes 41*b*. In other words, the fixing holes 90*d*, 91*d*, and 92*d* are configured and arranged to be aligned with the fixing holes 41*b*. A cylindrical depression 91*e* is formed at each of the fixing holes 91*d* by stepped pressing (one surface of the second member 91 is pressed using a mold) around the fixing hole 91*d* in the one side of second member 91.

The fastening or tightening members (pins) 22*c* are preferably constructed of a stainless steel alloy. Each of the fastening or tightening members (pins) 22*c* is mounted in one of the depressions 91*e* to extend through one of the fixing holes 90*d*, one of the fixing holes 91*d*, and one of the fixing holes 92*d*. Each tightening pin 22*c* has a head 93 and a shaft 94 with a smaller diameter than the head 93. The diameter of the head 93 is smaller than that of the depression 91*e* such that the head 93 is received in the depression 91*e* so as not to protrude beyond the depression 91*e*. In particular, in this embodiment, the end surface of the head 93 is substantially flush with the surface of the second member 91 in which the depression 91*e* is formed. The tightening pins 22*c* fixedly attach (tighten) the rotor member 22*b* to the hub mounting member 22*a*. Here, the thickness t1 of the first member 90 is between 0.5 and 1.5 mm, and the thickness t2 of the second members 91 and 92 is between 0.2 mm and 0.8 mm. Setting the thickness of the members 90 and 91/92 within this range will result in a relatively thicker first member 90 that is located in the center and has lower wear resistance, thus ensuring a relatively lighter weight overall while preserving strength. The relatively thinner second members 91 and 92 with higher wear resistance located on both sides also ensure a relatively lighter weight overall while preserving strength. In other words, the members 91 and 92 are preferably thinner than the member 90.

During the forming of the depressions 91*e*, the relatively softer first member 90 is compressed by a stepped pressing process or the like used to form the depressions 91*e*, making the member 90 thinner than the other components at the locations on the depressions 91*e*. The thickness of the relatively harder second member 91, on the other hand, is not deformed very much when the depressions 91*e* are formed by the stepped pressing process or the like. Thus, when the depressions 91*e* are formed by a stepped pressing process, only the softer first member 90 is compressed and becomes thinner when pressed, whereas the thickness of the harder second member 91 does not become deformed. Accordingly, when the rotor member 22*b* is tightened to the hub mounting member 22*a* by the tightening pin 22*c*, the first member 90 will not become further compressed, and thus, dents resulting from such further compression can basically be eliminated. As such, when the rotor member 22*b* is fixed to the hub mounting member 22*a* by the tightening pins 22*c*, it can be effectively tightened by the tightening pins 22*c*, without problems in being fixed to the hub mounting member 22*a*.

Figure 9:
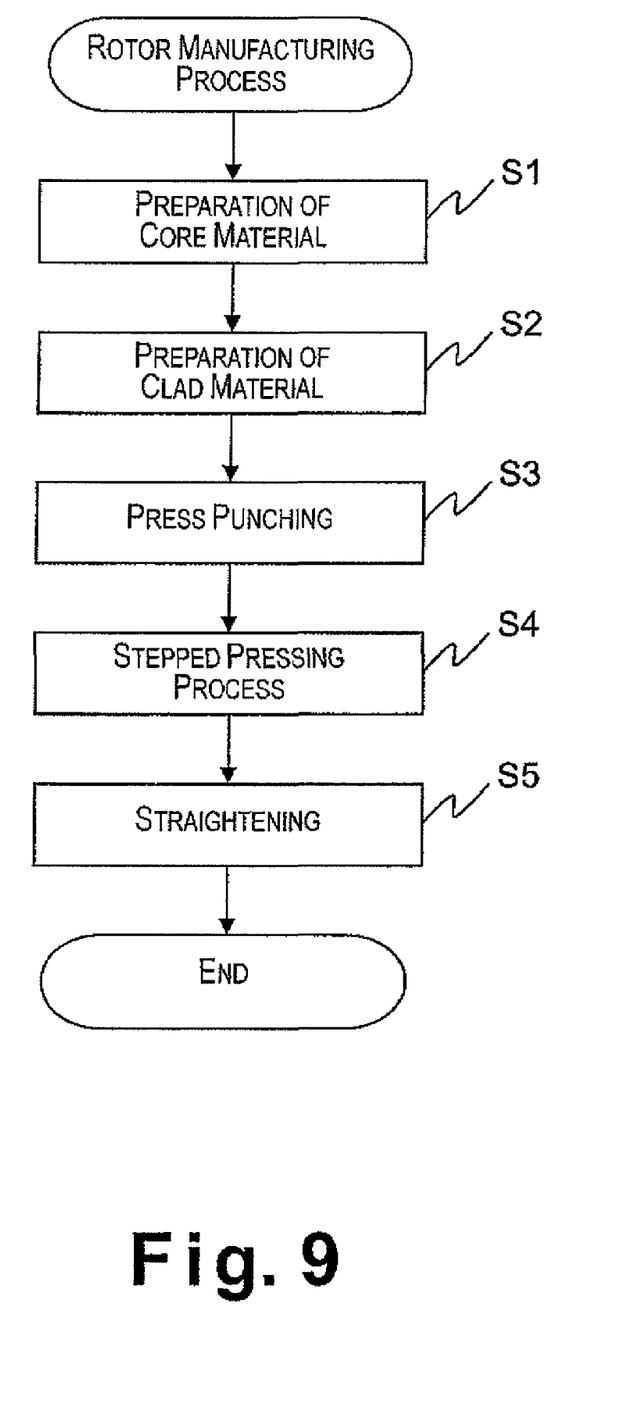
FIG. 9 is a flow chart of the processes for producing the disc brake rotor illustrated in FIGS. 1, 2 and 6-8.

This sort of rotor member 22*b* is produced by pressing a clad material comprising hardened stainless steel sheets (which will become the second members 91 and 92) press welded by means of hot rolling or forge welding to both sides of an aluminum sheet (which will become the first member 90). Specifically, as illustrated in FIG. 9, the aluminum sheet serving as the first member 90 and the stainless steel sheets serving as the second members 91 and 92 are first prepared (Step S1), the aluminum sheet is sandwiched between the stainless steel sheets, and the sandwiched core is then press welded by means of hot rolling or forge welding to produce a clad material comprising a stainless steel sheet press welded to both sides of the aluminum sheet (Step S2). The resulting clad material is then press punched to form a rotor member 22b of the desired shape (Step S3). A stepped pressing process is then carried out to form the depressions 91e (Step S4). During the stepped pressing process, a plurality of cylindrical molds for forming the depressions 91e are prepared and are pressed by a press machining device around the fixing holes 91d. Any warping in the rotor member 22b that is ultimately obtained is then corrected to finish the rotor member 22b (Step S5).

Figure 4:
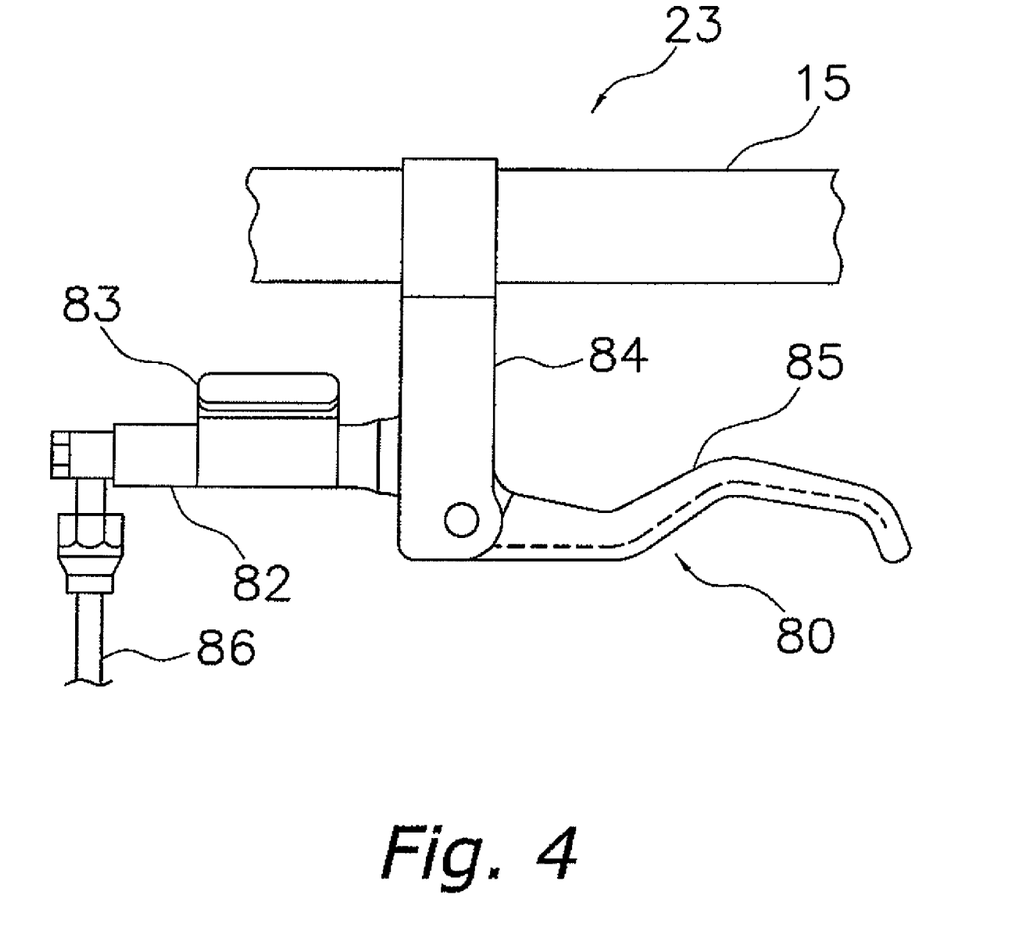
FIG. 4 is a top plan view of the disc brake operating mechanism of the disc brake device illustrated in FIGS. 1-3.

As illustrated in FIGS. 4 and 5, the brake operating mechanism 23 operates the piston unit 51 of the disc brake caliper 21 to forcibly pinch the disc brake rotor 22 between the brake pads 76, thereby applying a braking force to the front wheel 17. The brake operating mechanism 23 is integrally attached to the right end of the handlebar 15. The brake operating mechanism 23 basically comprises a brake lever assembly 80, master cylinder 81, master piston 82, and operating fluid tank 83.

As illustrated in FIGS. 4 and 5, the brake lever assembly 80 includes a bracket 84 mounted on the handlebar 15, and a lever component 85 pivotally mounted between the brake and release positions on the bracket 84. The bracket 84 is integrally formed with the master cylinder 81 therein. The master piston 82 and operating fluid tank 83 are supported by the bracket 84. The master piston 82 is movably (slidably) attached inside the master cylinder 81. Specifically, the operating fluid tank 83 is attached to the master cylinder 81 and communicates with a hole inside the master cylinder 81 to supply operating fluid. The master piston 82 is connected at one end to the lever component 85, allowing the master piston 82 to move axially inside the master cylinder 81. Thus, when the lever component 85 is operated, the master piston 82 moves axially inside the master cylinder 81. With this arrangement, the master piston 82 moves inside the master cylinder 81, allowing pressure oil to move through the hydraulic tubing 86 connected to the brake caliper 21. The pressure oil moves the pistons 74 and brake pads 76, so that the disc brake rotor 22 is pinched, thus applying a braking force to the front wheel 17.

In this disc brake device 12, when the brake operating mechanism 23 is operated, the piston unit 51 and brake pads 76 of the brake caliper 21 move between the release positions, where the disc brake rotor 22 can freely rotate, and the braking positions (not shown), where braking force is applied to the disc brake rotor 22. The brake operating mechanism 23 is basically constructed and operates in a conventional manner. Accordingly, the brake operating mechanism 23 will not be explained and/or illustrated in detail herein, except as related to the present invention. In other words, the brake operating mechanism 23 will not be explained and/or illustrated in detail herein, except as needed to make and use the present invention.

In this case, the depressions 91e are formed such that the first member 90 is thinner than the other components is provided around the fixing hole 91d, so that when the depressions 91 are formed, for example, by compressing the first readily deformable first member 90 by means of a stepped pressing process while the second members 91 and 92 are mounted on both sides of the first member 90, or a component serving as a preliminary depression of the first member 90 is formed by being cut into a cylindrical shape through a machining process, for example, and one of the second members is aligned with it to form a concave shape by means of a pressing process or the like, the first member 90 will be less likely to be further compressed, with less likelihood of becoming dented. The rotor member 22b can thus be effectively tightened by the tightening pin 22c to the hub mounting member 22a when tightened by the tightening pin 22c, without any tightening problems on the hub mounting member 22a.

Other Embodiments

Figure 10:
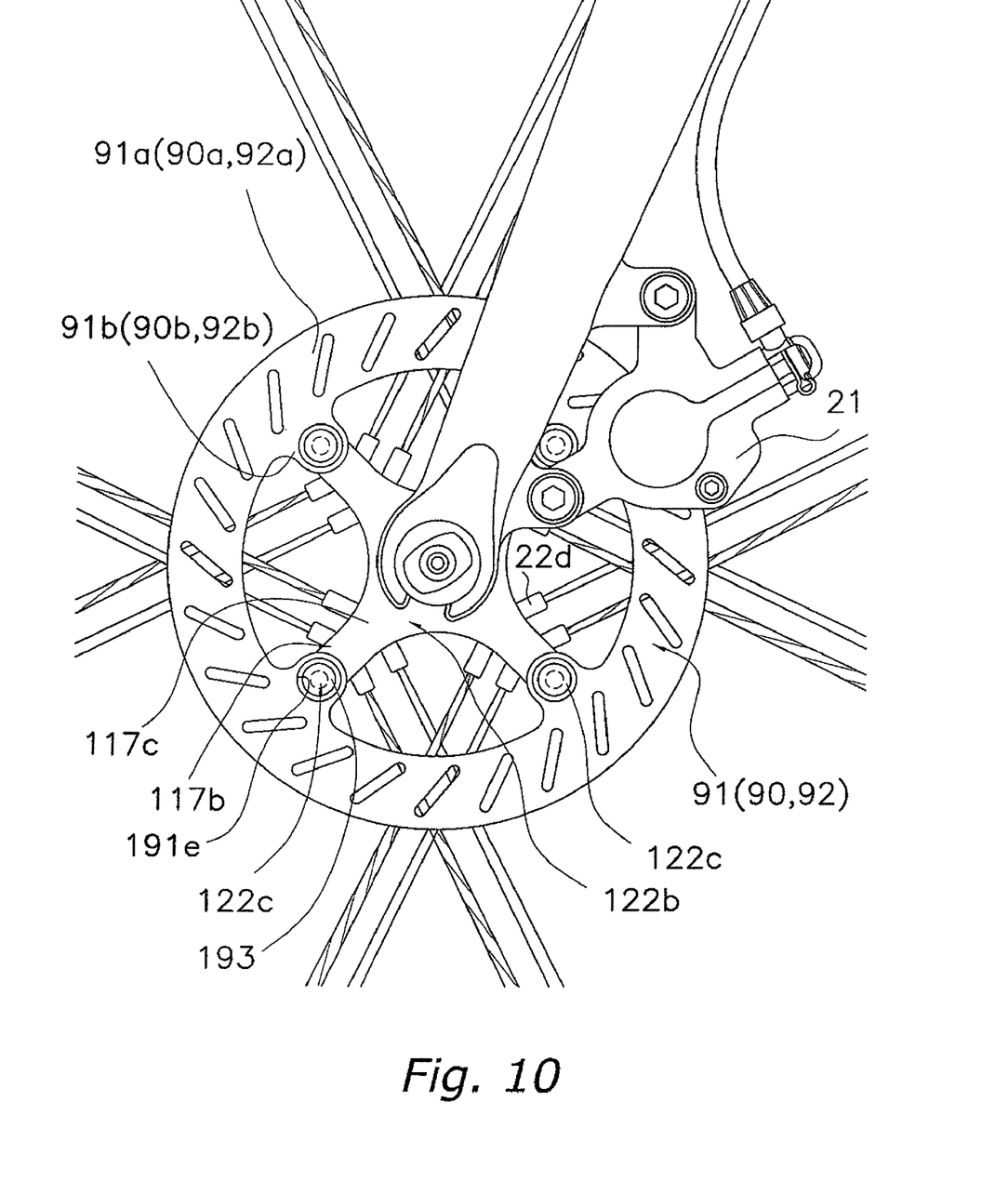
FIG. 10 is a side elevational view corresponding to FIG. 2 of another embodiment of the present invention.

A) In the previous embodiment, the rotor member 22b was mounted to the hub 17a indirectly utilizing the hub mounting member 22a. However, as shown in FIG. 10, a modified rotor member 122b may also be directly fixedly attached to a modified hub 117a without using the hub mounting member 22a of the previous embodiment. Such an arrangement is particularly suited to certain wheel spoking arrangements such as that shown in FIG. 10 for example. In this case, a rotor mounting component 117b with a plurality of (e.g. four) radially extending arms 117c is formed on or provided on (e.g. integrally formed with) the hub 117a. The modified rotor member 122b has a first member 90 and second members 91 and 92 in the same manner as in the above embodiment. Thus, the first and second members 90, 91, and 92 comprise the same first and second ring components 90a, 91a, and 92a as above, with first and second fixing components 90b, 91b, and 92b protruding radially inwardly and formed at equally spaced intervals in the peripheral direction along the inner periphery of the first and second ring components 90a, 91a, and 92a. The first and second fixing components 90b (four), 91b (four), and 92b (four) are tightened by means of, for example, a plurality of tightening pins 122c, to the tips of the arms 117c. A plurality of depressions 191e for housing the heads 193 of the tightening pins 122c are formed in one side of second fixing components 91b by means of a stepped pressing process in a manner identical to the previous embodiment. In this embodiment, the first member 90 and the second members 91 and 92 are illustrated with weight reduction (lightening) holes (not numbered) in FIG. 10, which have a different configuration from the previous embodiment. These holes provide the same function as the holes 90c, 91c and 92c of the first embodiment. Moreover, the first member 90 and the second members 91 and 92 illustrated in FIG. 10 have fewer fixing components 90b (four), 91b (four), and 92b (four) than the previous embodiment. Thus, this embodiment is substantially identical to the previous embodiment. Accordingly, some parts that are functionally identical to parts of the previous embodiment will be given the same reference numerals for the sake of convenience and brevity, even though they are not identical to the parts of the previous embodiment. In view of the similarities between this embodiment and the previous embodiment, it will be apparent to those skilled in the art from this disclosure that the descriptions and illustrations of the previous embodiment also apply to this embodiment, except as explained and illustrated herein.

B) In the above embodiments, the first member 90 was constructed of aluminum alloy, and the second members 91 and 92 were constructed of stainless steel alloy. However, the present invention is not limited to these materials. The second members 91 and 92 may be constructed of any material with higher wear resistance than the first member 90. The first member 90 should be lighter and have better thermal conductivity than the second members 91 and 92, to ensure a lighter weight and better heat dissipation. The first member 90 can be constructed of a light carbon fiber-reinforced resin or carbon graphite, and the second members 91 and 92 may be constructed of a ceramic. The first member 90 may also be constructed of a titanium or magnesium alloy.

C) In the above embodiments, the examples of the fastening or tightening members (fixing means) included tightening pins. However, but the fixing means is not limited to tightening pins. For example, the fixing means may include bolts.

Figure 11:
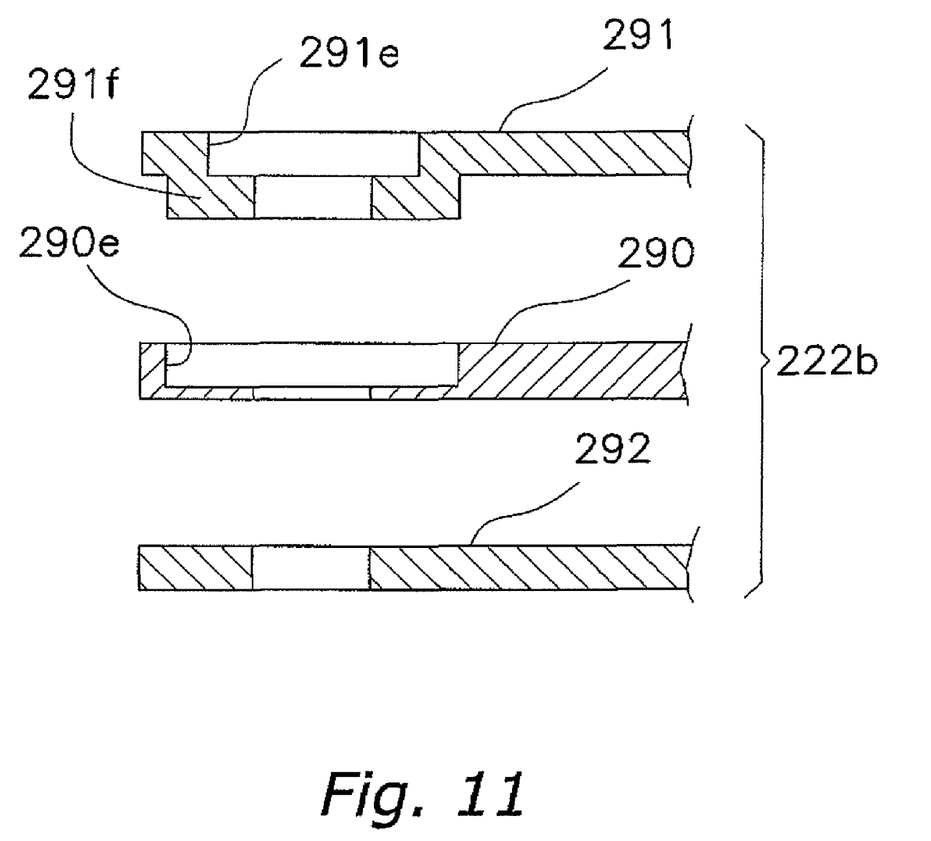
FIG. 11 is an enlarged, partial schematic (diagrammatic) cross sectional view of a disc brake rotor illustrating the formation of the depression in accordance with another embodiment of the present invention.

D) In the above embodiments, the depressions 91e and 191e were formed by a stepped pressing process. However, as illustrated in FIG. 11, for example, a cylindrical depression 290e may be machined into the first member 290. In such an arrangement, the one side of the second member 291 may have a plurality of depressions 291e, and a plurality of protrusions 291f to fit into depressions 290e of the first member 290. The depressions 290e may be formed by a pressing process or the like. The first and second members 290, 291, and 292 are pressure bonded to form a modified rotor member 222b having a depression 291e. In view of the similarities between this embodiment and the previous embodiments, it will be apparent to those skilled in the art from this disclosure that the descriptions and illustrations of the previous embodiment also apply to this embodiment, except as explained and illustrated herein.

E) In the above embodiments, the tightening pins 22c and 122c were constructed of stainless steel alloy. However, the tightening pins 22c and 122c may alternatively be constructed of aluminum alloy. With such an arrangement, heat will be conducted more efficiently through the tightening pins from the first and second members to the mounting member or hub, for better heat dissipation.

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member", "component" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle disc brake rotor assembly for a bicycle disc brake device, the bicycle disc brake rotor assembly comprising:
   a rotor member including a first ring-shaped member and a pair of second ring-shaped members disposed on opposite sides of the first ring-shaped member, the second ring shaped members including a material with higher wear resistance than the first ring-shaped member, the second ring shaped members defining brake pad engaging friction surfaces of the rotor member on exposed sides thereof, the first ring-shaped member having a first thickness measured in an axial direction relative to the rotor member in the region adjacent to the brake pad engaging friction surfaces and the pair of second ring-shaped members each having a second thickness measured in the axial direction in the region of the brake pad engaging friction surfaces, at least one fixing hole being formed through the first ring-shaped member and the second ring-shaped members with at least one depression formed in the surface of the rotor member such that the first ring-shaped member has a reduced thickness less than the first thickness in an area corresponding to the depression around the fixing hole and each of the second ring-shaped members has a thickness in the area corresponding to the depression around the fixing hole that is approximately the same as the second thickness;
   a rotor mounting component that is integrally formed with a hub, the rotor mounting component having at least one fixing hole aligned with the at least one fixing hole of the rotor member; and
   at least one fastening member mounted through the at least one fixing hole of the first ring-shaped member and the second ring shaped members of the rotor member and the at least one fixing hole of the rotor mounting member to fixedly attach the rotor member to the rotor mounting component.

2. The bicycle disc brake rotor according to claim 1, wherein
   the rotor member has a plurality of fixing holes formed through the first ring-shaped member and the second ring-shaped members with a plurality of depression formed in the surface of one of the second ring-shaped members around the fixing holes;
   the rotor mounting component has a plurality of fixing holes aligned with the fixing holes of the rotor member; and
   a plurality of fastening members are mounted through the fixing holes of the rotor member and the fixing holes of the rotor mounting member to fixedly attach the rotor member to the rotor mounting component.

3. The bicycle disc brake rotor according to claim 2, wherein
   the rotor mounting member includes a plurality of radially extending arms with each of the radially extending arms having a fixing hole formed therein that is aligned with one of the fixing holes of the rotor member.

4. The bicycle disc brake rotor according to claim 3, wherein
   the rotor mounting member includes four radially extending arms that are circumferentially equally spaced from each other.

5. The bicycle disc brake rotor according to claim 3, wherein
   the first ring-shaped member includes a plurality of first fixing components extending radially inwardly from an inner peripheral surface thereof, and each of the second ring-shaped members includes a plurality of second fixing component extending radially inwardly from an inner peripheral surface thereof that are aligned with first fixing components, the fixing holes of the rotor member extending through the first and second fixing components.

6. The bicycle disc brake rotor according to claim 1, wherein
the rotor mounting component includes a material with greater thermal conductivity than the second members.

7. The bicycle disc brake rotor according to claim 1, wherein
the first ring-shaped member includes at least one first fixing component extending radially inwardly from an inner peripheral surface thereof, and each of the second ring-shaped members includes at least one second fixing component extending radially inwardly from an inner peripheral surface thereof that are aligned with at least one first fixing component, the at least one fixing hole extending through the first fixing component and the second fixing components aligned with the first fixing component.

8. The bicycle disc brake rotor according to claim 1, wherein
the at least one depression is formed utilizing a stepped pressing process that presses the surface of one of the second members using a mold.

9. The bicycle disc brake rotor according to claim 1, wherein
the first ring-shaped member includes a material with greater thermal conductivity than the second ring-shaped members.

10. The bicycle disc brake rotor according to claim 1, wherein
the first ring-shaped member is constructed of an aluminum alloy, and the second ring-shaped members are constructed of a stainless steel alloy.

11. The bicycle disc brake rotor according to claim 10, wherein
each of the second ring-shaped members includes a hardened material that has undergone a hardening process.

12. The bicycle disc brake rotor according to claim 11, wherein
the rotor member is constructed by pressing clad materials including sheets of the hardened stainless steel that are pressure welded by hot rolling or forge welding to both sides of an aluminum sheet.

13. The bicycle disc brake rotor according to claim 1, wherein
the first member is between 0.5 mm and 1.5 mm thick, and each of the second members is between 0.2 mm and 0.8 mm thick.

14. The bicycle disc brake rotor according to claim 1, wherein
the at least one fastening member includes a head that is received in the at least one depression and a shaft of smaller diameter than the head.

15. The bicycle disc brake rotor according to claim 14, wherein
the head is received in the at least one depression so as not to protrude from the at least one depression.

16. The bicycle disc brake rotor according to claim 14, wherein
the fastening member is a tightening pin configured to tighten the first and second members together to the rotor mounting member.

17. The bicycle disc brake rotor according to claim 16, wherein
the tightening pin is constructed of stainless steel alloy.

18. The bicycle disc brake rotor according to claim 1, wherein
the second ring-shaped members are constructed as separate members from each other.

19. A bicycle disc brake rotor assembly for a bicycle disc brake device, the bicycle disc brake rotor assembly comprising:
a rotor member including a first ring-shaped member and a pair of second ring-shaped members fixed to opposite sides of the first ring-shaped member, the first ring-shaped member having at least one first fixing component extending radially inwardly from an inner peripheral surface thereof and each of the second ring-shaped members having at least one second fixing component extending radially inwardly from an inner peripheral surface thereof aligned with the at least one first fixing component, each of the second ring shaped members having oppositely facing brake pad engaging friction surfaces that include a material with higher wear resistance than the first ring-shaped member;
a rotor mounting component that is integrally formed with a hub; and
at least one fastening member fixedly attaching the at least one first fixing component and the at least one second fixing component of the second ring-shaped members of the rotor member to the rotor mounting component, the material of the oppositely facing brake pad engaging friction surfaces overlying the at least one second fixing component of at least one of the second ring-shaped members such that the at least one fastening member contacts the material of the oppositely facing brake pad engaging friction surfaces at the at least one second fixing component of at least one of the second ring-shaped members.

20. The bicycle disc brake rotor according to claim 19, wherein
the first ring-shaped member includes a plurality of first fixing components extending radially inwardly therefrom in a circumferentially spaced arrangement and each of the second members includes a plurality of second fixing components extending radially inwardly therefrom in a circumferentially spaced arrangement to be aligned with the first fixing components, and a plurality fastening members fixedly attach the first fixing component and the second fixing components of the rotor member to the rotor mounting component.

* * * * *